July 6, 1948.  E. C. BRULL  2,444,897
CREAM WHIPPER
Filed Nov. 3, 1945  2 Sheets-Sheet 1
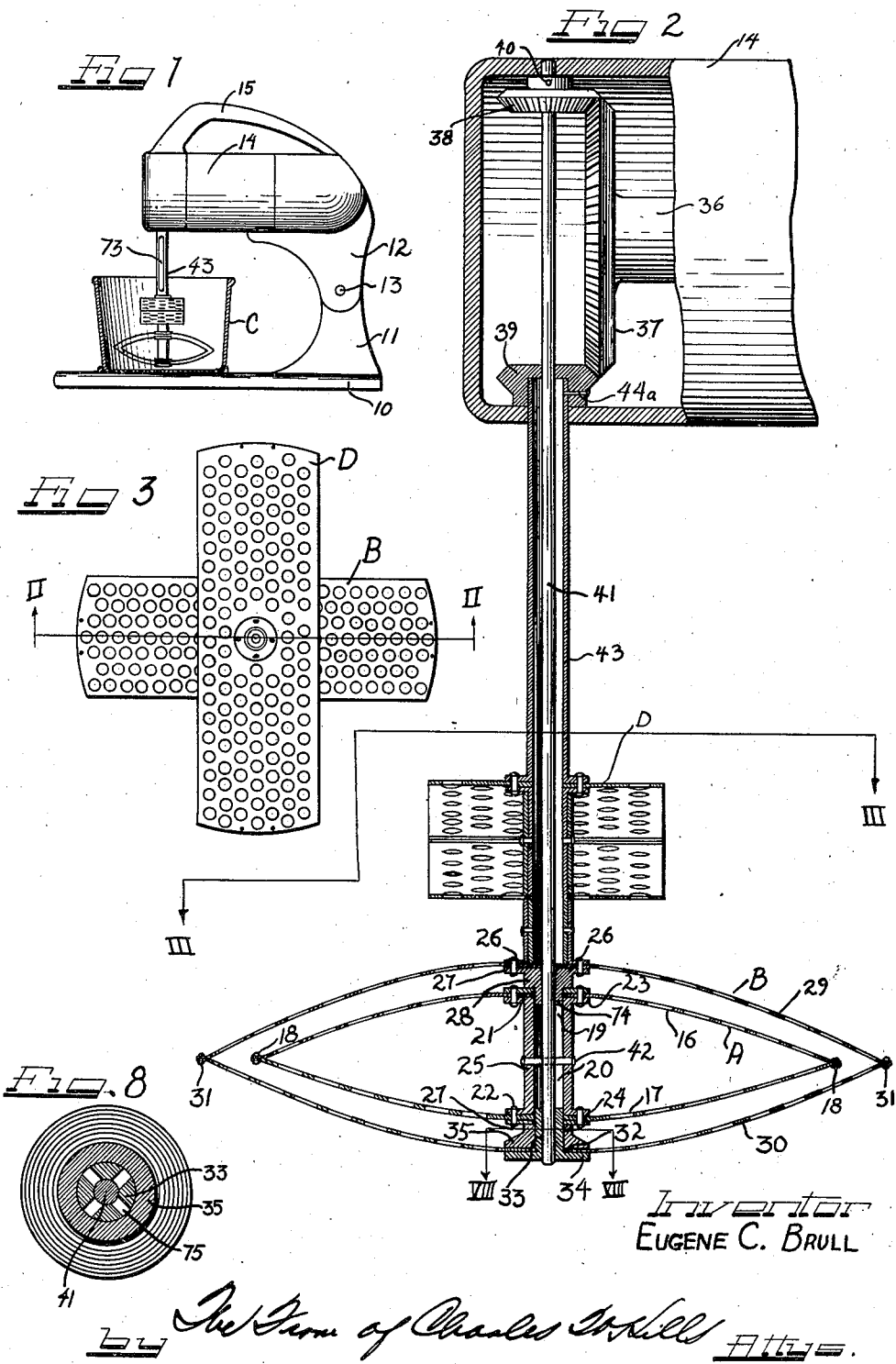
Inventor
EUGENE C. BRULL

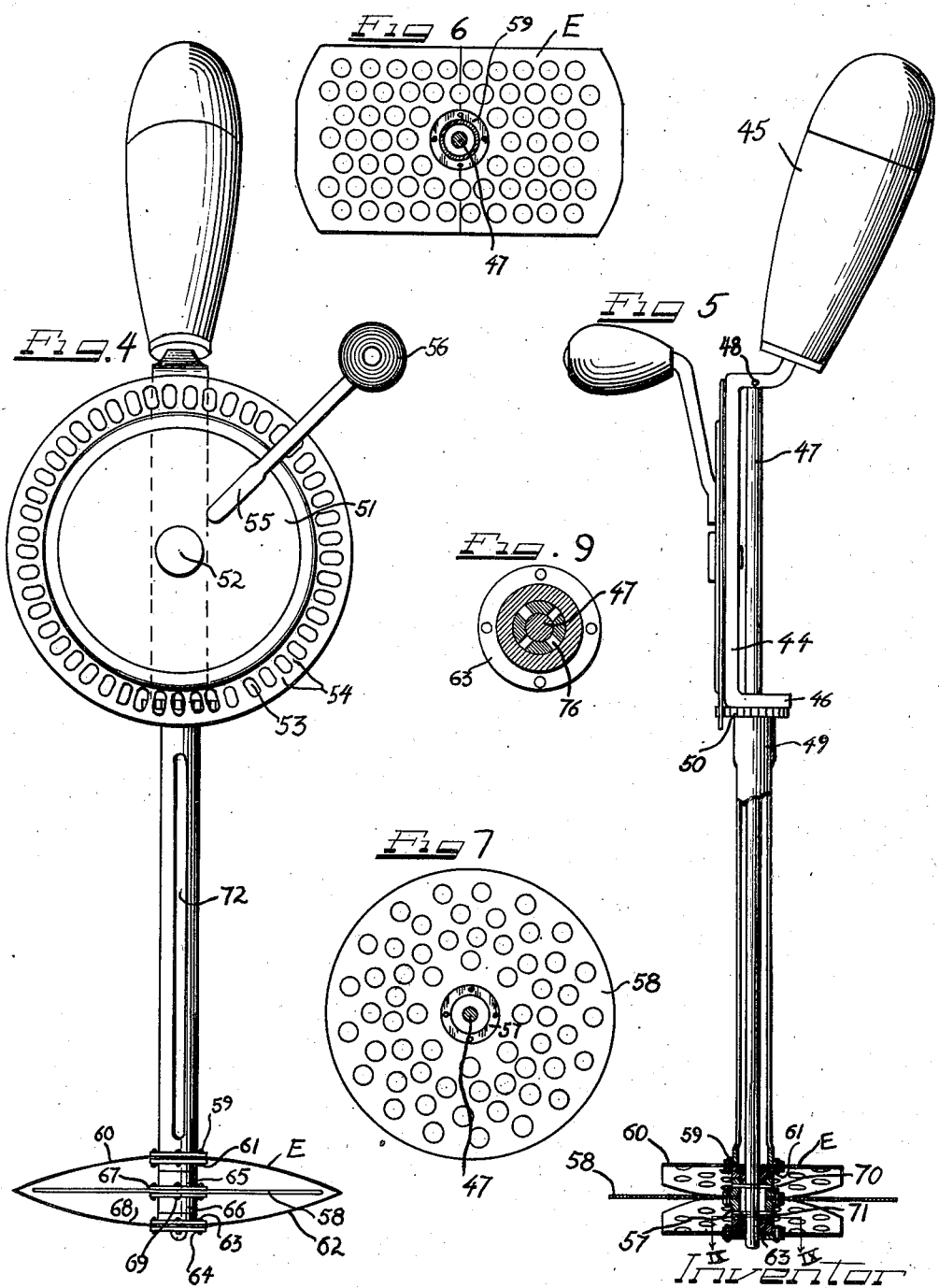

Patented July 6, 1948

2,444,897

UNITED STATES PATENT OFFICE 2,444,897

CREAM WHIPPER

Eugene C. Brull, Forest Park, Ill.; Eugene E. Brull administrator of said Eugene C. Brull, deceased Application November 3, 1945, Serial No. 626,541

1 Claim. (Cl. 259—132)

The present invention relates to a cream whipper, and more particularly to a utensil which will more effectively whip cream than the devices heretofore used.

An object of the present invention is to provide a cream whipper which will whip not only whipping cream but coffee cream as well.

An object of the present invention is to provide a cream whipper which will whip coffee cream as readily as whipping cream.

Another object of the present invention is to provide a cream whipper with a double dasher arrangement, one dasher being disposed inwardly of the other and the dashers perforated, together with means for relatively rotating the two dashers.

A further object of the present invention is to provide a double dasher arrangement for a cream whipper wherein the dashers are formed of flat strip metal bent or formed into elliptical shape in side elevation, arranging the dashers one inside of another and connecting the dashers for relative rotation.

A still further object of the present invention is to provide a double dasher arrangement for whipping cream wherein vacuum is created by the provision of a plurality of perforations in the dashers which aerates the cream sufficiently so that coffee cream may be whipped as well as whipping cream.

The above, other and further objects of the present invention will be apparent from the following description and accompanying drawings.

Embodiments of the present invention are illustrated in the accompanying drawings, and the views thereof are as follows:

Figure 1 is a side elevational view of a motor driven mixer having the whipper of the present invention thereto applied, and showing in section a bowl for the cream.

Figure 2 is an enlarged vertical sectional view through the whipper arrangement of Figure 1, showing relationship of certain of the parts, section being taken on line II—II of Figure 3.

Figure 3 is a top plan view of the dashers taken on the plane indicated by line III—III of Figure 2.

Figure 4 is a front elevational view of a hand-operated whipper having applied thereto the dasher arrangement of the present invention.

Figure 5 is a view similar to Figure 4 taken at 90° thereto, showing certain parts in section and other parts in elevation.

Figure 6 is a top plan view of the outer dasher of the arrangements shown in Figures 4 and 5;

Figure 7 is a top plan view of the inner dasher of the arrangements shown in Figures 4 and 5.

Figure 8 is a section taken on line VIII—VIII of Figure 2, and

Figure 9 is a section taken on line IX—IX of Figure 5.

The drawings will now be explained.

Referring to Figure 1, a known type of electrically driven mixer is illustrated, and includes a base 10, an upright 11, to which is pivoted at 13 a support 12 for the motor casing, designated generally at 14, and 15 designates a handle for rocking the motor structure on the pivot 13.

The dashers of the present invention are constructed from thin, flat, sheet metal, profusely perforated, and formed into elliptical shape in side elevation.

Referring to Figure 2, A designates an inner dasher while B designates an outer dasher, these dashers being suitably secured for relative rotation.

The inner dasher A includes an upper piece of metal 16, and a similarly shaped piece of metal 17, riveted or welded together at their ends as indicated at 18. The central portions of the plates are apertured as at 19 and 20 where the margins of the apertures are riveted at 21 and 22 to flanges 23 and 24 of a sleeve 25. The arrangement of the plates 16 and 17, in this manner, forms a dasher which is elliptical in side elevation as may be observed in Figure 2.

The margins of the plates of the dasher B about the central apertures therein are riveted at 26 to the flange 27 of a centrally apertured block 28 mounted on top of the sleeve 21.

The upper plate 29 of the outer dasher B is riveted at its ends to the lower plate 30 as at 31, with the central portion of the plates bowed or separated as illustrated in Figure 2. The margin of the lower plate 30 adjacent its central aperture 32 receives the shank 33 of a plug with the head 34 of the plug bearing against the outer surface of the lower plate 30. Between the central portion of the lower plate 17 of the inner dasher A and the lower plate 30 of the outer dasher B is a separator 35 apertured to receive the plug.

Within the motor casing 14 is a suitable electric motor driving a shaft which rotates the stem 36 of a bevel gear 37. The bevel gear 37 is in mesh with an upper bevel gear 38 and a lower bevel gear 39. The upper gear 38 is fastened as by a pin 40 to a vertically depending shaft 41 which passes through the plug a block 28. A pin 42 connects the sleeve 25 to the shaft 41 in driving relation.

A sleeve 43 surrounds the shaft 41 and at its upper end is connected to the lower bevel gear 39 in driving relation. The drawings show a pin 44a through the hub of the gear 39 into the sleeve 43.

It will be thus noted that as the bevel gear 37 is rotated the shaft 41 will be rotated in one direction and the sleeve 43 in the opposite direction. The inner dasher A being connected in driving relation to the shaft 41 will rotate it with it. The outer dasher B being connected to the sleeve 43 will rotate with it.

By reason of the perforations in the plates forming the dashers A and B a vacuum is created in the cream, when the dashers are rotated, so that the cream very quickly whips.

The form of the invention illustrated in Figures 1, 2 and 3 is intended for commercial use, such as the large whippers for bakeries, restaurants, clubs and the like in connection with the use of which a large bowl C would be used for containing the cream to be whipped. Where the bowl is high, and the lot of cream is in it to be whipped, there may be added a third dasher D, of the same form and construction as described with respect to the dashers A and B, attached to the sleeve 43, above the dasher B, and with its length at right angles to the length of the dasher B. According to Figure 3 it will be observed that the length of the dasher D is slightly greater than the length of the dasher B so as to extend almost to the inclined divergent walls of the bowl C to break up any air bubbles there may be arising from the mass of cream within which the dashers A and B are rotating. With the provision of the additional dasher D the cream may be very quickly whipped.

By reason of the fact that the dashers are formed as shown and described, with the plates profusely perforated, the mass of cream is quickly aerated thus hastening the making of the whipped cream. It has been demonstrated that the construction of the present invention easily and quickly whips coffee cream to say nothing of the whipping of whipping cream.

Referring to the form of the invention illustrated in Figures 4 and 5, a hand-held whipper is illustrated, comprising a frame 44 having a handle 45 at its upper end and with its lower end bent forming a flange 46. A spindle 47 is fastened to the frame by a pin 48, extends down to the flange 46 which flange is suitably apertured for it. Supported below the flange 46 and surrounding the spindle 47 is a sleeve 49 supporting a spur gear 50 at its upper end. A driving gear 51 is pivoted at 52 to the frame 44, with the gear disposed in vertical plane, the gear being provided with a plurality of radially extending circumferentially spaced elongated holes 53 with walls or partitions 54 between the holes, the walls or partitions constituting teeth for meshing with the teeth of the spur gear 50 to rotate the sleeve 49 whenever the gear 51 is rotated by means of a crank 55 fastened to it, having a knob or handle 56.

Near the lower end of the spindle 47 is pinned a bearing block 57 supporting a circular disk 58 which is profusely perforated.

Riveted to the lower end of the sleeve 49, as at 59 is the upper plate 60 of an electrical dasher member E, as shown in side elevation in Figure 4.

The dasher E is made of one piece of sheet metal, bent to the form illustrated in Figure 4, with the free ends of the piece of material brought together about the spindle 47, in the manner shown in Figure 6. Referring to Figure 4, it will be observed that the flange 59 connects the ends of the dasher E to a flange 61 against the inner surface of the meeting ends of the place and resting on top of the block 57, by suitable rivets. A central portion of the lower portion 62 of the sheet of the dasher E is apertured to receive the lower end of the spindle 47 and has riveted to it inner and outer flanges 63 and 64, as may be fully observed in Figures 4 and 5. Separating the flanges 61 and 63, axially, are sleeves 65 and 66 having flanges 67 and 68 receiving the dasher 58 between them, with rivets 69 through the flanges and dasher. A pin 70 fastens the sleeve 65 to the spindle 47 while a pin 71 fastens the sleeve 66 to the spindle 47, thus holding the dasher 58 against rotation. The flange members 61 and 63 have axially extending passages 76 through them through which cleaning water passes, the water having been discharged with force into the slot 72 of the sleeve 49.

The sleeve 43 of the form shown in Figures 1 and 2 is likewise slotted at 73 through which water is forced for cleaning the device.

The block 28 has an end portion 74 of reduced diameter entered in the upper end of sleeve 25 as a bearing. The shank 33 is entered in the lower end of the sleeve as a bearing. The block 28 and the shank 33 have axially extending surface passages 75 through which water may escape from the device while it is being cleaned.

In this form of the invention the gear 51 is rotated by hand which rotation rotates the sleeve 49 and with it the dasher E. The dasher E is profusely perforated, so that as it is rotated, vacuum is created between it and the disk 58 thus quickly whipping the cream.

With a hand device such as that shown in Figures 4 and 5, I have successfully whipped coffee cream in less than two minutes.

Rotating the dasher B with respect to the dasher A creates a vacuum in the mass of cream thus quickly causing it to whip.

The shaft 41 and sleeve 43 have been shown for permanent connection to the motor casing 14. It is to be understood that both the shaft and sleeve could be connected for ready removal for cleaning purposes, by means well known in the art.

It is to be understood that the material used in the construction of the devices of the present invention will be such as not to contaminate the cream being whipped nor to be corroded by the cream, e. g., stainless steel, nickle plate and the like.

It will be noted that the present invention contemplates a cream whipper in which a double dasher arrangement is used, the dashers being nested, and of elliptical shape in side elevation. It is the relative rotation of these dashers, which are profusely perforated, that accomplishes the rapid and quick whipping of cream especially of coffee cream.

The same principle is involved in the hand-operated whipper of Figures 4 and 5. In these figures I have illustrated them as comprising an outer dasher E as of elliptical shape in side elevation and an inner dasher comprising a plate. It is within the purview of the present invention to substitute for the plate 58 a dasher which is elliptical in side elevation and which may be arranged within the confines of the dasher E.

It will, of course, be understood that various details of construction may be varied through a wide range without departing from the principles of this invention and it is, therefore, not the purpose to limit the patent granted hereon otherwise than necessitated by the scope of the appended claim.

I claim as my invention:

A cream whipper including a drive shaft, means for rotating it, a dasher secured to an end of said shaft, said dasher comprising two rectangular thin flat sheets of bendable material permanently fastened together at their ends and arranged with their central portions immovably secured to said shaft in separated relation axially of said shaft and defining an ellipse in side elevation; said dasher being attached to said shaft with its major axis at right angles to the length of the shaft; the immovable connection of said sheets to said shaft preventing any deformation of the sheets as the dasher is rotated with the shaft.

EUGENE C. BRULL.

REFERENCES CITED

The following references are of record in the file of this patent:

UNITED STATES PATENTS

| Number | Name | Date |
|---|---|---|
| 846,661 | Godward | Mar. 12, 1907 |
| 1,426,080 | Holt | Aug. 15, 1922 |
| 1,577,615 | Emery | Mar. 23, 1926 |
| 1,707,789 | Fitzpatrick | Apr. 2, 1929 |
| 1,726,977 | Brull | Sept. 3, 1929 |

FOREIGN PATENTS

| Number | Country | Date |
|---|---|---|
| 219,201 | Great Britain | July 24, 1924 |